Figure 1:

United States Patent [19]

Roy et al.

[11] 4,036,937
[45] July 19, 1977

[54] DIAMOND SYNTHESIS

[76] Inventors: Alexander Rose Roy, 16 Cecil St., Meredale, Johannesburg, Transvaal; Anthony Bayliss Clarke, Plot 54, "Vischkuil", P.O. Endicot, Transvaal, both of South Africa

[21] Appl. No.: 505,982

[22] Filed: Sept. 13, 1974

[30] Foreign Application Priority Data

Sept. 14, 1973  South Africa .................. 73/7322

[51] Int. Cl.² ............................................. C01B 33/06
[52] U.S. Cl. ................................... 423/446; 51/307
[58] Field of Search .............. 423/446; 23/252; 51/307

[56] References Cited
U.S. PATENT DOCUMENTS

| 2,947,609 | 8/1960 | Strong | 423/446 |
| 2,947,611 | 8/1960 | Bundy | 423/446 |
| 3,442,616 | 5/1969 | Wakatsuki et al. | 423/446 |

Primary Examiner—Edward J. Meros

[57] ABSTRACT

The invention provides elongate synthetic RD diamond particles, each particle having a long axis and a short transverse axis, the ratio of the long axis to the short axis being at least 3 to 1. Each particle generally has a rib bed structure down its long axis, the ribs of the structure being traces of {111} crystallographic planes and the long axis providing a backbone for the structure and being in the direction <100> crystallographic direction. The invention further provides a resin bond grinding wheel in which these particles are radially oriented. The particles may be made by providing a body of solvent metal in contact with a body of carbonaceous material in a reaction zone, producing zones of the weakness in the carbonaceous body and subjecting the contents of the zone to conditions of pressure and temperature suitable for RD diamond growth so causing the solvent metal to penetrate the zones of weakness and produce the particles.

11 Claims, 6 Drawing Figures

DIAMOND SYNTHESIS

This invention relates to diamond synthesis.

The production of man-made or synthetic diamonds has been known for many years and consists essentially in subjecting a carbonaceous material such as graphite or amorphous carbon in the presence of a suitable solvent metal to conditions of temperature and pressure sufficient to cause the formation of diamond. Very high temperatures and pressures are required and one suitable type of apparatus for producing such pressures and temperatures is the so-called "belt" apparatus described in U.S. patent No. 2,941,248. Descriptions of synthetic diamond production, including details of various suitable solvent metals, known in the prior art can be found in other U.S. Pat. such as Nos. 2,947,610 and 2,947,609.

At least three types of synthetic diamond may be produced. A first type is known as resin bond diamond (RD), a second type is metal bond diamond (MD) and a third type is saw diamond (SD). The RD type of diamond has an irregular shape and tends to fracture, so continually presenting fresh surfaces, when subjected to abrasive operations. MD and SD diamonds, on the otherhand, generally present a blocky crystal of high impact resistance. These particles tend to wear by abrasion processes rather than by fracture.

According to the invention there is provided an elongate synthetic RD diamond particle having a long axis and a transverse short axis, the ratio of the long axis to the short axis being at least 3 to 1. The diamonds of the invention are RD diamonds which means that they are friable and tend to fracture during abrasive operations so continually presenting fresh sharp cutting points. The particles may have a ratio of long axis to short axis of at least 5 to 1.

The length to width aspect is more pronounced with the larger particles. The particles are preferably in the range 60/170 U.S. mesh and more preferably either in the range 80/100 U.S. mesh or 100/120 U.S. mesh.

The particle of the invention preferably has a ribbed structure down its long axis, the ribs of the structure being traces of {111} crystallographic planes and the long axis providing the backbone for the structure and being in the <100> crystallographic direction. The particles of the invention may have an enlarged end. The backbone is preferably of irregular shape.

The particles of the invention, particularly those having enlarged ends, are generally not of uniform width. Consequently, in these cases the short axis of largest dimension is taken when determining the ratio of long axis to short axis. The long axis is generally uniquely defined, but when it is not the long axis of largest dimension is taken for the ratio determination.

Figure 2:
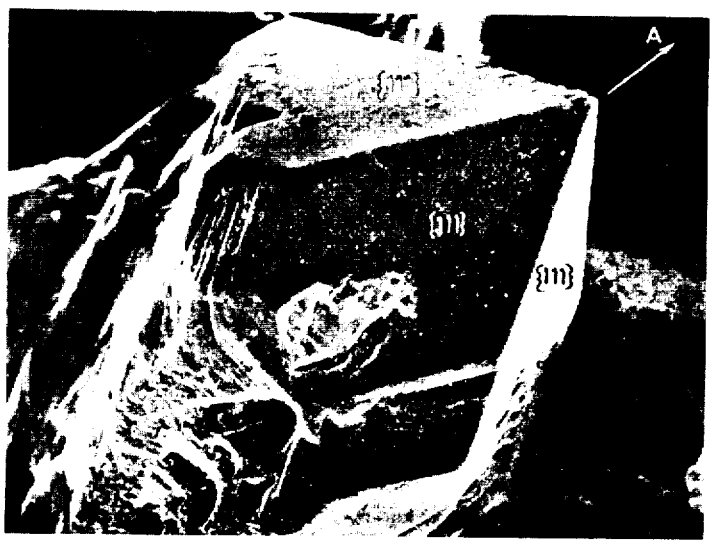

The photographs shown as FIGS. 1 and 2 illustrate examples of diamond particles of the invention. FIG. 1 is a photograph of 550 magnification and FIG. 2 is a photograph of 2750 magnification.

Referring to FIGS. 1 and 2, the particle marked "X" is a good example of an elongate particle of the invention. This particle has an enlarged end 30 and a narrow end 32.

The particle has a long axis 34. The short axis, as mentioned above, is the width of the large end, i.e. the transverse axis of largest dimension, and is indicated between 36 and 38. The long axis 34 provides the backbone for the ribbed structure, with the ribs being shown at 40. The backbone is in the <100> crystallographic direction shown by arrow A and the ribs 40 are traces of {111} crystallographic planes. The {111} crystallographic planes are clearly marked on the two figures. It is to be noted that particle presents similar appearances from the directions B or C or from the reverse side of the particle not shown.

The diamond particles of the invention may be metal coated using techniques well known in the art. Such coated particles find application particularly in resin bond wheels.

According to another aspect of the present invention, there is provided a resin bond grinding wheel having a hub portion and an operative portion bonded thereto, the operative portion providing the working face for the wheel and containing an effective quantity of diamond particles as described above so held in a resin matrix that their long axes are aligned substantially transverse to the working face. Apart from the aligned particles, the operative portion may contain some non-aligned particles of the invention and some prior art particles. Resin bond grinding wheels are well known in the art, as is their method of manufacture. They are made by providing a suitable mould around a hub portion, generally of a material such as bakelite, introducing a mixture of powdered resin starter components, diamond and filler into the mould, and applying pressure and heat to the contents of the mould to cause the resin to cure and set. The resin may be a polymide resin or a phenolformaldehyde resin.

The amount of diamond in the operative portion of the wheel will vary according to the type of wheel. Generally the diamond content (including both aligned diamonds of the invention and other diamond particles) will constitute about 10 to 25 percent by volume of the operative portion.

The particles of the invention may be aligned in the operative portion by means of an impressed field of force using known techniques. The impressed field may be an electrostatic field. Alternatively, the particles may be coated with a magnetic material such as a ferro-magnetic metal and the particles aligned by means of an externally impressed magnetic field.

Figure 3:
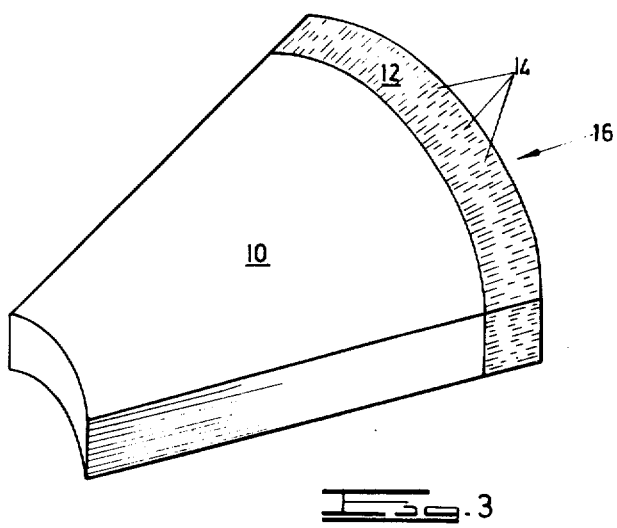

FIG. 3 of the attached drawings illustrates schematically a segment of a resin bond wheel containing aligned particles of the invention. Referring to the drawing, the hub portion of the wheel is shown at 10 and the working portion at 12. The particles 14 of the invention are so held in a resin matrix that their long axes are substantially transverse to the working face 16, i.e. the long axes are substantially radially oriented.

The particles of the invention in the wheel are preferably metal coated, the metal preferably being nickel.

According to yet another aspect of the invention, there is provided a method of making RD diamond particles including the steps of providing a reaction zone, placing a body of solvent metal in contact with a body of carbonaceous material in the reaction zone, producing zones of weakness in the carbonaceous body, and causing solvent metal to penetrate the zones of weakness and produce elongate RD diamond particles, each having a long axis and a short transverse axis, the ratio of the long axis to the short axis being at least 3 to 1, by subjecting the contents of the reaction zone to conditions of temperature and pressure suitable for RD diamond growth.

Figure 4:
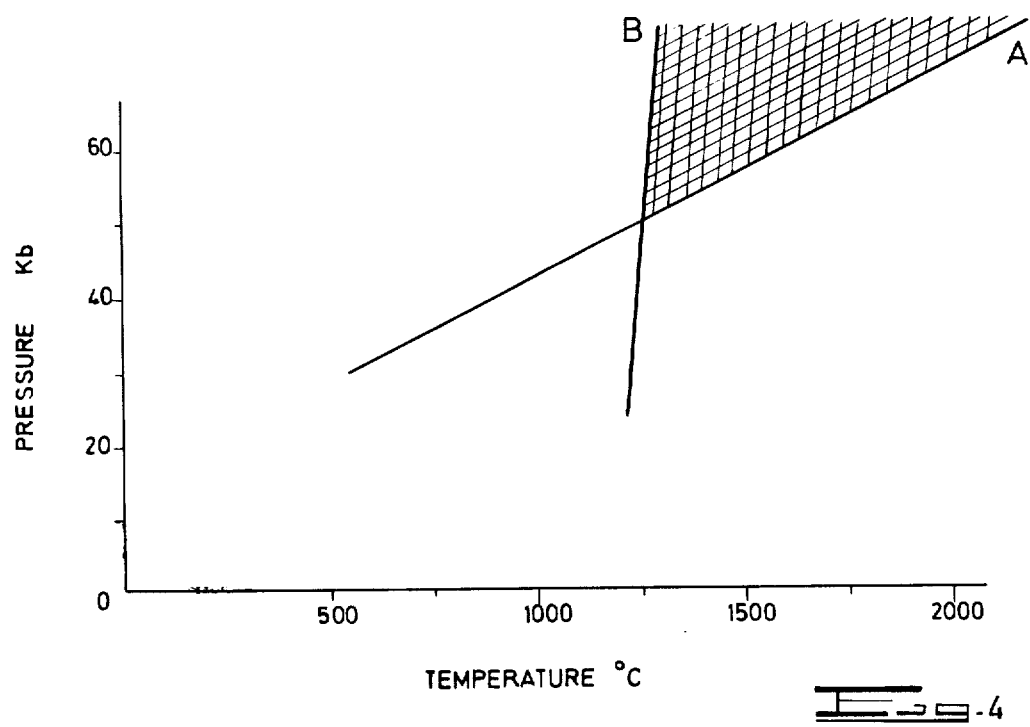

The conditions necessary for diamond growth are well known in the art and details can be found in the above-mentioned U.S. patent specifications. Referring to FIG. 4 of the attached drawings, the diamond growing region is shown by the shaded area of the graph, i.e. the area above the line A and to the right of the line B. Line A defines the Berman-Simon line (Zeit. F. Elektrochemie, 59,355 (1955) ) and line B is the eutectic melting temperature of the solvent metal. The position of line B will vary according to the type of solvent metal used.

In order to produce RD diamonds the conditions of temperature and pressure are maintained in the diamond growing region for a relatively short period, i.e. generally for a period of between 4 to 10 minutes. It is preferred that the temperature and pressure conditions be raised from ambient to the diamond growing region in a stepwise manner.

It is to be noted that the above method produces a mixture of particles having enlarged heads as illustrated by FIGS. 1 and 2, similar particles in which the enlarged heads have been broken off, elongate particles other than "X" as shown in FIG. 1 and some non-elongate particles.

The body of carbonaceous material is preferably sandwiched between the body of metal solvent and a wall of the reaction zone. The carbonaceous material may be in contact with the wall. The reaction zone may be lined with a thin foil of a non-reactive metal such as tantalum which does not prevent the creation of the necessary zones of weakness.

The carbonaceous material may be provided in the form of a sleeve around a core of the solvent metal. The sleeve may be a continuous sleeve or a number of segments which together define the sleeve. A carbonaceous disc may be provided at each end of the core. The ratio of the width of the sleeve to the diameter of the core is preferably in the range 1:20 to 1:5. In particular, the width of the sleeve may be about one tenth the diameter of the core. The weight ratio of metal to carbonaceous material will generally be greater than 1.

The core body will generally be coherent.

The carbonaceous material is preferably graphite.

The heating for the reaction zone may be provided indirectly, but is preferably provided directly through the reaction zone.

The solvent metal may be any of the solvent metals known in the art for diamond growth and as described, for example, in the above mentioned U.S. specifications which are incorporated herein by reference. It is to be understood that the term "solvent metal" as used in this specification means alloys as well as pure metals. A particularly useful solvent metal is an alloy of a carbide-forming metal and a metal of the 8th Group of the Periodic Table. The weight ratio of the carbide forming metal to the metal of the 8th Group is preferably in the range 70:30 to 30:70 on a weight basis. The carbide-forming metal is preferably manganese and the metal of the 8th Group is preferably cobalt.

Figure 5:
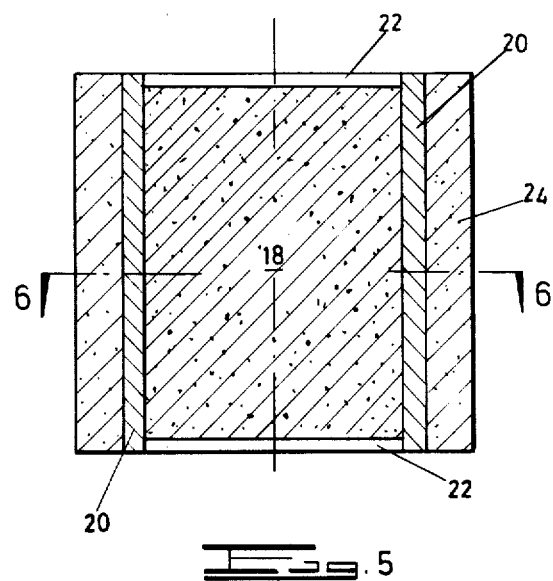

An embodiment of the invention will now be described with reference to the accompanying drawings. FIGS. 1 to 4 of these drawings have already been described above. FIG. 5 illustrates schematically a sectional side view of a reaction capsule containing a solvent metal core and graphite sleeve for diamond production and FIG. 6 is a section along the line 6—6 of FIG. 5.

Figure 6:
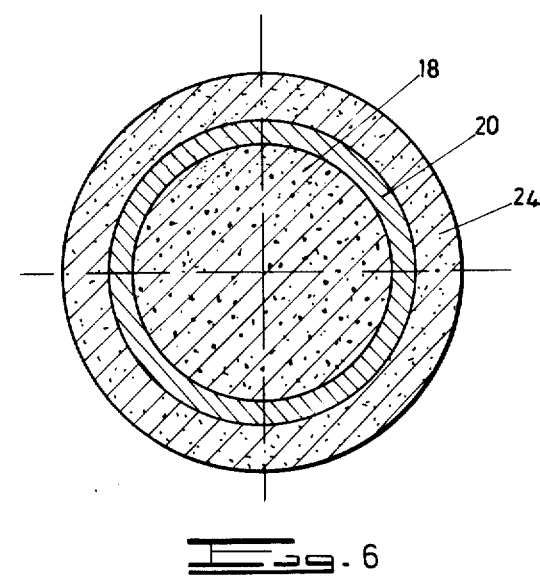

Referring to FIGS. 5 and 6, a manganese-cobalt alloy core 18 is placed inside a graphite sleeve 20. Graphite discs 22 are placed on both ends of the core 18 and the whole is placed inside a pyrophyllite sleeve 24.

The core 18 was made by mixing powdered manganese and cobalt in equal amounts by weight and compressing the mixture into the cylindrical form using a pressure of about 25 tons/sq. in. The manganese powder was 80/100 U.S. mesh and the cobalt powder was minus 200 U.S. mesh. The compressed slug had a height:diameter ratio of about 1:1.

The graphite sleeve and discs were made from commercially available electrode grade graphite. The width of the sleeve was about 1/10 the diameter of the core.

The weight ratio of the graphite to the manganese-cobalt alloy was about 1:4.

The graphite/metal/pyrophillite composite was placed in a high temperature/pressure apparatus of the type described in U.S. patent No. 2,941,248 referred to above in the usual way.

The temperature and pressure of the contents of the reaction zone were raised to the diamond growing region of the Pressure/Temperature graph illustrated by FIG. 4 in a stepwise manner, i.e. the pressure was raised a certain number of kilobars and then the temperature raised a certain number of degrees and so on until the desired conditions were obtained. A number of runs were performed using pressures in the range of from 55 to 65 kilobars and temperatures in the range of from 1300° to 1600° C. In each run the diamond growing temperature and pressure conditions were maintained for a period of between 4 to 10 minutes during which RD diamond growth occurred. Thereafter, the reaction capsule was quenched in the conventional manner and the pressure allowed to return to ambient pressure. The diamond content of the reaction capsule was recovered using conventional recovery techniques.

The recovered diamond was found to consist of a mixture of normal RD diamond and elongate RD diamonds having a length to width ratio of 3:1 or more. Examples of these particles are illustrated by the attached photographs which are described in some detail above. The particles varied in size and the peak distribution was found in general to be in the range 80/100 U.S. mesh. About 60% of each run was of the elongate type.

It is to be noted that in each run heating for the reaction zone was achieved by direct electrical heating of the graphite sleeve and metal core.

It is believed that the growth of the elongate particles takes place as follows. Exertion of pressure on the wonderstone causes it to deform. This in turn causes the graphite sleeve, which cannot deform significantly, to weaken in certain longitudinal zones. The alloy on melting penetrates these zones and, as it does, so it dissolves the graphite which precipitates as diamond. As the alloy progresses into the zones and outwards towards the pyrophillite sleeve so the elongate particle is produced.

A number of other runs were performed in the same manner using an iron/manganese alloy and a cobalt-/nickel/manganese alloy. In each case the diamond recovered from the reaction capsule contained a certain proportion of the elongate particles of the type illustrated by "X" of the attached photographs.

The effectiveness of the elongate RD diamond particles in resin bond wheels was investigated. RD diamond particles in the range 80/100 U.S. mesh and containing about 80% elongate particles of the invention were nickel clad (55 weight percent based on the weight of the coated particle) using known techniques. The clad particles were mixed, in an amount of 12.5 volume percent based on the unclad particles, with 25 volume percent phenolformaldehyde resin starter and about 62.5 percent conventional powdered inorganic fillers such as silicon carbide. The mixture was poured into a mould around a bakelite hub in the manner described above. Before setting and curing the resin, the elongate particles were oriented so that substantially all had long axes transverse to the working face of the wheel, i.e. radially oriented, using a magnetic field. Pressure was applied to the mixture in the mould and the temperature raised to cause setting and curing of the resin. The resulting wheel had an operative resin portion containing 50 concentration of diamond particles.

The wheel was a 5 × 3/16 inch D1A1 wheel and its efficiency under grinding conditions was tested on a Carboloy 370 (a registered trademark) workpiece using a table tranverse of 50 ft/min. a crossfeed of 0,050 inches, a downfeed of 0,001 inches, a spindle speed of 3700 rpm and a total downfeed of 0,040 inches. It was found that under these conditions the average G. ratio of the wheel tested to destruction was 82. The G-ratio, as is known, is a ratio of the amount of workpiece removed to the amount of grinding wheel used during grinding. The higher the G-ratio the better the wheel.

For comparison purposes, a similar wheel was produced using a commercially available RD diamond grit of the same size. The cladding of the grit and manufacture and characteristics of the wheel were as described for the wheel containing elongate particles of the invention save for the absence of any orientation. The resulting wheel was tested in the same manner as the wheel containing the particles of the invention radially oriented.

It was found that the wheel containing the prior art clad grit had a G-ratio of only 56. Moreover, the power consumption for the wheel containing the prior art clad grit was higher than the power consumption for the wheel containing the oriented grit of the invention.

We claim:

1. In a method of making RD diamond particles wherein a solvent metal is placed in contact with a carbonaceous material in a reaction zone and the contents of the reaction zone are subjected to elevated conditions of temperature and pressure to convert the carbonaceous material into diamond, the elevated conditions of temperature and pressure being maintained for a period suitable for RD diamond growth, the improvement comprising:
providing the carbonaceous material in the form of a sleeve around a core of the solvent metal, the ratio of the width of the sleeve to the diameter of the core being in the range 1:20 to 1:5, whereby zones of weakness are produced in the sleeve and the solvent metal penetrates the zones of weakness when the contents of the reaction zone are subjected to the elevated conditions of temperature and pressure and elongate RD diamond particles are produced.

2. A method according to claim 1 wherein the width of the sleeve is about one tenth the diameter of the core.

3. A method according to claim 1 wherein the carbonaceous material is graphite.

4. A method according to claim 1 wherein the solvent metal is an alloy of manganese and cobalt.

5. A method according to claim 4 wherein the ratio of the manganese to the cobalt in the alloy is in the range 30:70 to 70:30 on a weight basis.

6. A method according to claim 1 wherein the elevated conditions of temperature and pressure are in the ranges 1300° C to 1600° C and 55 to 65 kilobars, respectively, and these conditions are maintained for a period of 4 to 10 minutes.

7. In a cabonaceous material-solvent metal assembly for insertion in the reaction zone of a high temperature-pressure apparatus for the conversion of the carbonaceous material into RD diamond particles, the improvement comprising:
providing the carbonaceous material in the form of a sleeve around a core of the solvent metal, the ratio of the width of the sleeve to the diameter of the core being in the range 1:20 to 1:5.

8. An assembly according to claim 7 wherein the width of the sleeve is about one tenth the diameter of the core.

9. An assembly according to claim 7 wherein the carbonaceous material is graphite.

10. An assembly according to claim 7 wherein the solvent metal is an alloy of manganese and cobalt.

11. An assembly according to claim 10 wherein the ratio of the manganese to the cobalt in the alloy is in the range 30:70 to 70:30 on a weight basis.

* * * * *